United States Patent
Lee et al.

(10) Patent No.: US 11,558,552 B2
(45) Date of Patent: *Jan. 17, 2023

(54) IMAGE SIGNAL PROCESSOR, IMAGE PROCESSING SYSTEM, AND OPERATING METHOD OF IMAGE SIGNAL PROCESSOR

(71) Applicant: SAMSUNG ELECTRONICS CO., LTD., Suwon-si (KR)

(72) Inventors: Joo Hyun Lee, Hwaseong-si (KR); Il Do Kim, Suwon-si (KR); Seong Wook Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,048

(22) Filed: Sep. 13, 2021

(65) Prior Publication Data
US 2022/0070373 A1 Mar. 3, 2022

Related U.S. Application Data

(63) Continuation of application No. 16/550,188, filed on Aug. 24, 2019, now Pat. No. 11,140,320.

(30) Foreign Application Priority Data

Jan. 9, 2019 (KR) .................. 10-2019-0002570

(51) Int. Cl.
*H04N 5/228* (2006.01)
*H04N 5/232* (2006.01)
(Continued)

(52) U.S. Cl.
CPC ......... *H04N 5/23245* (2013.01); *H04N 5/213* (2013.01); *H04N 5/23216* (2013.01); *H04N 5/23218* (2018.08); *H04N 5/357* (2013.01)

(58) Field of Classification Search
CPC ........... H04N 5/23245; H04N 5/23216; H04N 5/23218; H04N 5/213; H04N 5/357;
(Continued)

(56) References Cited

U.S. PATENT DOCUMENTS 8,902,330 B2 12/2014 Theuwissen
9,179,113 B2 11/2015 Tachi
(Continued)

OTHER PUBLICATIONS

Lars Rehm, Sony IMX586 smartphone sensor comes with 48 MP and Quad Bayer design, Jul. 23, 2018.

*Primary Examiner* — Kelly L Jerabek
(74) *Attorney, Agent, or Firm* — Volentine, Whitt & Francos, PLLC

(57) ABSTRACT

An image signal processor includes a shared circuit, a first circuit, and a second circuit. The shared circuit processes input image data. The first circuit provides a first algorithm for processing the input image data and is used by the shared circuit to process the input image data at a first operation mode in a first shooting environment. The second circuit provides a second algorithm for processing the input image data and is used by the shared circuit to process the input image data at a second operation mode different from the first operation mode in a second shooting environment different from the first shooting environment.

20 Claims, 12 Drawing Sheets

(51) Int. Cl.
*H04N 5/213* (2006.01)
*H04N 5/357* (2011.01)

(58) Field of Classification Search
CPC .... H04N 5/343; H04N 5/2258; H04N 9/0451; H04N 9/04515
See application file for complete search history.

(56) References Cited

U.S. PATENT DOCUMENTS

| | | |
|---|---|---|
| 9,325,957 B2 | 4/2016 | Tanaka et al. |
| 9,549,161 B2 | 1/2017 | Lu |
| 9,697,796 B2 | 7/2017 | Darshan et al. |
| 9,824,632 B2 | 11/2017 | Chaji et al. |
| 11,140,320 B2 * | 10/2021 | Lee ................... H04N 9/04515 |
| 2014/0028872 A1 | 1/2014 | Lee et al. |
| 2014/0285672 A1 | 9/2014 | Hogasten et al. |
| 2017/0178292 A1 | 6/2017 | Jiang et al. |
| 2019/0191102 A1 * | 6/2019 | Tsuboi ................... G03B 17/14 |

\* cited by examiner

IMAGE SIGNAL PROCESSOR, IMAGE PROCESSING SYSTEM, AND OPERATING METHOD OF IMAGE SIGNAL PROCESSOR

CROSS-REFERENCE TO RELATED APPLICATION

This is a Continuation of U.S. application Ser. No. 16/550,188, filed Aug. 24, 2019, which issued as U.S. Pat. No. 11,140,320 on Oct. 5, 2021, and a claim of priority under 35 U.S.C. § 119 is made to Korean Patent Application No. 10-2019-0002570, filed on Jan. 9, 2019 in the Korean Intellectual Property Office, the contents of which are herein incorporated by reference in the entirety.

BACKGROUND

1. Technical Field

The present disclosure relates to an image signal processor, an image processing system, and an operating method of the image signal processor.

2. Description of the Related Art

An image sensor may shoot a subject and transmit image data according to a specific format to an image signal processor. For example, the image sensor may transmit the shooting result as bayer format image data to the image signal processor or may transmit the shooting result as tetra (or quad) format image data to the image signal processor. In general, the bayer format is widely used, but in a low light environment in which a light intensity is insufficient, a tetra format resistant to noise may be used.

When the image signal processor supports only the bayer format, in order for the image signal processor to process the image data of the tetra format, there is a need for a remosaic computation for converting the image data of the tetra format into the bayer format. This is because a pixel arrangement is different between the bayer format and the tetra format. However, since the remosiac computation performs a work of moving the pixels to another position to change the pixel arrangement of the tetra format to the pixel arrangement of the bayer format, there are problems of an occurrence of loss of information and an occurrence of resolution degradation.

SUMMARY

Aspects of the present disclosure provide an image signal processor which processes image data of different formats, and which is capable of directly processing the image data without the need for converting one format to another format, while not separately configuring hardware of each format.

According to an aspect of the present disclosure, an image signal processor includes a shared circuit, a first circuit and a second circuit. The shared circuit processes input image data. The first circuit provides, to the shared circuit, a first algorithm which is used by the shared circuit to process the input image data at a first operation mode in a first shooting environment. The second circuit provides, to the shared circuit, a second algorithm which is used by the shared circuit to process the input image data at a second operation mode different from the first operation mode in a second shooting environment different from the first shooting environment.

According to another aspect of the present disclosure, an image processing system includes an image signal processor and a mode deciding module. The image signal processor includes a shared circuit and multiple algorithmic circuits. The shared circuit is configured to process input image data. The multiple algorithmic circuits are configured to provide to the shared circuit algorithms which are used to process the input image data in different operation modes depending on a shooting environment. The mode deciding module detects the shooting environment based on information provided from an image sensor or an ambient light sensor and decides the operation mode of the image signal processor.

According to another aspect of the present disclosure, an operating method of an image signal processor includes setting an operation mode for processing input image data and selecting first format image data provided from an image sensor as the input image data, when the operation mode is a first operation mode. The operating method also includes selecting second format image data provided from the image sensor as the input image data, when the operation mode is a second operation mode different from the first operation mode. The input image data is processed using a first circuit, when the operation mode is the first operation mode, and is processed using a second circuit, when the operation mode is the second operation mode.

However, aspects of the present disclosure are not restricted to the ones set forth herein. The above and other aspects of the present disclosure will become more apparent to one of ordinary skill in the art to which the present disclosure pertains by referencing the detailed description of the present disclosure given below.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION OF THE EMBODIMENTS

Various embodiments of the present disclosure will be described below with reference to the accompanying drawings.

Figure 1:
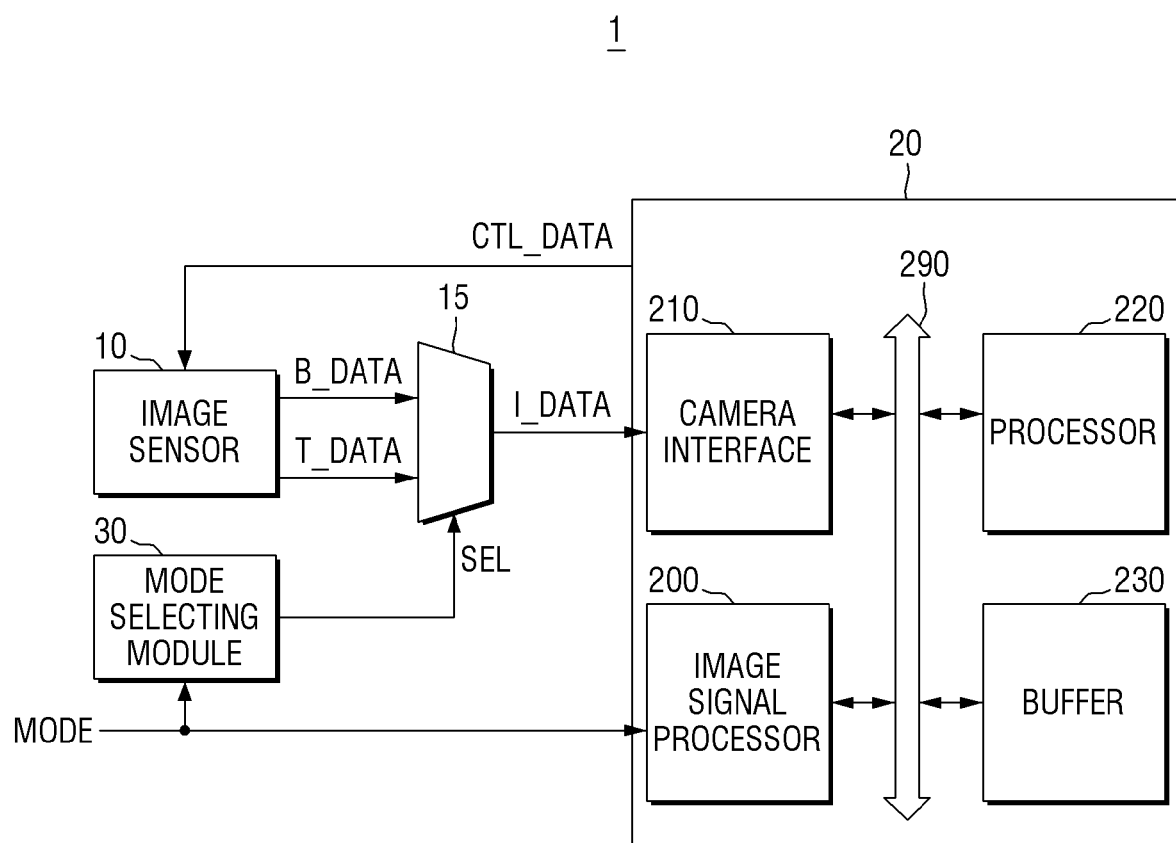
FIG. 1 is a diagram illustrating an image processing system according to an embodiment of the present disclosure.

FIG. 1 is a diagram illustrating an image processing system according to an embodiment of the present disclosure.

Referring to FIG. 1, an image processing system 1 according to an embodiment of the present disclosure includes an image sensor 10, a multiplexing circuit 15, a SoC 20 (system-on-chip) and a mode selecting module 30. Here, the SoC 20 may be implemented as an AP (Application Processor), but the scope of the present disclosure is not limited thereto.

The image sensor 10 may operate under the control of the SoC 20. For example, the image sensor 10 may receive control data CTL_DATA from the SoC 20 and may start or end shooting according the control data CTL_DATA.

The image sensor 10 shoots a subject using a lens, and generates image data (B_DATA, T_DATA). Further, the image sensor 10 may transmit one of the image data (B_DATA, T_DATA) generated as the shooting result to the SoC 20 as the input image data I_DATA.

The image sensor 10 may generate the image data (B_DATA, T_DATA) by capturing the subject in various ways in various shooting environments. Specifically, the image sensor 10 may capture the subject in/under a first shooting environment to generate the first format image data B_DATA and may capture the subject in/under a second shooting environment different from the first shooting environment to generate the second format image data T_DATA.

In the present embodiment, the first shooting environment is a general environment, and the first format image data B_DATA may be bayer format image data. Here, the general environment is a concept contrasted with a low light environment to be described later. The general environment refers to a shooting environment having a comparatively sufficient light quantity, and this may be considered a high light environment, a default environment, a normal environment, a standard environment, a primary environment, an intended operational environment, and so on, such as a day time shooting environment and/or an outdoor shooting environment.

On the other hand, in the present embodiment, the second shooting environment is a low light environment, and the second format image data T_DATA may be tetra format image data. Here, the low light environment refers to a shooting environment in which the light quantity is comparatively insufficient and the degree of occurrence of noise is relatively higher than in a general environment, such as a nighttime shooting environment and/or an indoor shooting environment.

As is already well-known, the pixel configurations of the bayer format and the tetra format are different from each other. Specifically, in the case of the bayer format, the pixel arrangement is performed such that G (green), R (red), and B (blue) are not adjacent to each other. In particular, within a pixel region of 2×2, pixels may be arranged so that G including more brightness information occupies 2 pixels, and each of R and B occupies 1 pixel. In contrast, in the case of the tetra format, the pixels may be arranged such that the four pixels of the same color are adjacent to each other, and the pixels may be arranged such that the four pixel regions are set as one unit region, and the unit regions have the arrangement similar to the bayer format. The tetra format has a noise-resistant characteristic because of having such a pixel arrangement, and therefore may be usefully used in a low light environment.

The multiplexing circuit 15 selects one of the image data (B_DATA, T_DATA) generated by the image sensor 10, outputs it as the input image data I_DATA and transmits the input image data I_DATA to the SoC 20. The multiplexing circuit 15 may receive input of a selection signal SEL from the mode selecting module 30 to be described later for the aforementioned selection.

The image sensor 10 may transmit or cause to be transmitted the input image data I_DATA selected through the multiplexing circuit 15 to the SoC 20 in various manners. For example, the image sensor 10 may transmit the input image data I_DATA to the camera interface 210, and to this end, the input image data I_DATA may be serialized in various forms in accordance with any various policies. The serialized input image data I_DATA may be transmitted to the image signal processor 200 of the SoC 20 via the camera interface 210.

The SoC 20 may include the image signal processor 200, the camera interface 210, the processor 220, the buffer 230 and the like.

The image signal processor 200 processes the input image data I_DATA provided from the image sensor 10 via the multiplexing circuit 15. For example, the image signal processor 200 may execute at least one computation on the input image data I_DATA to convert the input image data I_DATA into an image having, for example, an RGB channel. Here, at least one computation may include a cross-talk compensation, a bad pixel correction, a merging or reconstruction of multiple exposure pixels, demosaicing, a noise reduction, image sharpening, an image stabilization, a color space conversion, a compression, and the like, but the scope of the present disclosure is not limited thereto.

The camera interface 210 supports the data movement between the image sensor 10 and the image signal processor 200. Especially, when the image sensor 10 and the image signal processor 200 are implemented as separate chips rather than a single chip, the camera interface 210 is disposed between the image sensor 10 and the image signal processor 200 to support the transmission of data.

The processor 220 may generally control the SoC 20. Specifically, the processor 220 may execute a program including instructions for operating not only the image signal processor 200 but several elements of the SoC 20. The processor 220 may be implemented as, for example, a CPU (Central Processing Unit), a GPU (Graphic Processing Unit), or the like, but the scope of the present disclosure is not limited thereto.

The buffer 230 provides a space which may temporarily store data. For example, the image signal processor 200 may temporarily store the image data in the buffer 230 as necessary. In addition, a program executed by the processor 220 may be loaded into the buffer 230, and data used by the program may be stored in the buffer 230. The buffer 230 may be implemented as, for example, a SRAM (Static Random Access Memory), a DRAM (Dynamic Random Access Memory), or the like. However, the buffer 230 is not limited to SRAM or DRAM, and the buffer 230 may also be implemented, for example, as a nonvolatile memory as needed.

An internal bus 290 acts as a path which enables elements in the SoC 20, that is, the image signal processor 200, the camera interface 210, the processor 220, the buffer 230 and the like, to exchange the data with each other. Here, the internal bus 290 may be implemented as, for example, an AXI (Advanced Extensible Interface) that follows an AMBA (Advanced Microcontroller Bus Architecture), but the scope of the present disclosure is not limited thereto.

The configuration of such a SoC 20 is merely an example embodiment, and the scope of the present disclosure is not limited thereto. For example, the SoC 20 may further include additional elements such as an I/O interface which provides data exchange with external devices located outside the SoC 20, and a register which provides data storage space, and some of the elements illustrated in FIG. 1 may be omitted.

The mode selecting module 30 selects the first format image data B_DATA provided from the image sensor 10 in a first operation mode as the input image data I_DATA. The mode selecting module 30 selects the second format image data T_DATA provided from the image sensor 10 in a second operation mode as the input image data I_DATA.

Specifically, the mode selecting module 30 receives the operation mode signal MODE and provides the selection signal SEL to the multiplexing circuit 15 in accordance with the operation mode signal MODE. For example, when the value of the operation mode signal MODE means the first operation mode, the mode selecting module 30 provides the selection signal SEL having the first value to the multiplexing circuit 15, thereby enabling the multiplexing circuit 15 to select the first format image data B_DATA among the image data (B_DATA, T_DATA) generated by the image sensor 10. In contrast, when the value of the operation mode signal MODE means a second operation mode different from the first operation mode, the mode selecting module 30 provides the selection signal SEL having a second value different from the first value to the multiplexing circuit 15, thereby enabling the multiplexing circuit 15 to select the second format data T_DATA among the image data (B_DATA, T_DATA) generated by the image sensor 10.

In this embodiment, the first operation mode may be a bayer format processing mode. On the other hand, in the present embodiment, the second operation mode may be a tetra format processing mode.

The operation mode signal MODE is provided not only to the mode selecting module 30 but to the image signal processor 200. When the value of the operation mode signal MODE means the first operation mode, the image signal processor 200 recognizes the first format to process the input image data I_DATA. When the value of the operation mode signal MODE means the second operation mode, the image signal processor 200 recognizes the second format to process the input image data I_DATA.

Particularly, it is noted that the image signal processor 200 does not perform the format conversion in order to process the input image data I_DATA in each operation mode. That is, the image signal processor 200 processes or may process the input image data I_DATA without performing format conversion. For example, when operating in the bayer format processing mode, the image signal processor 200 uses the input image data I_DATA of the bayer format as it is without format conversion. When operating in the tetra format processing mode, the image signal processor 200 uses the input image data I_DATA of the tetra format as it is without format conversion.

Accordingly, since the image processing system 1 of the present disclosure does not perform the remosiac computation of moving the pixels to another place for changing the pixel arrangement of tetra format to the pixel arrangement of bayer format, it is possible to prevent a phenomenon of loss of information and/or degradation of resolution.

Figure 2:
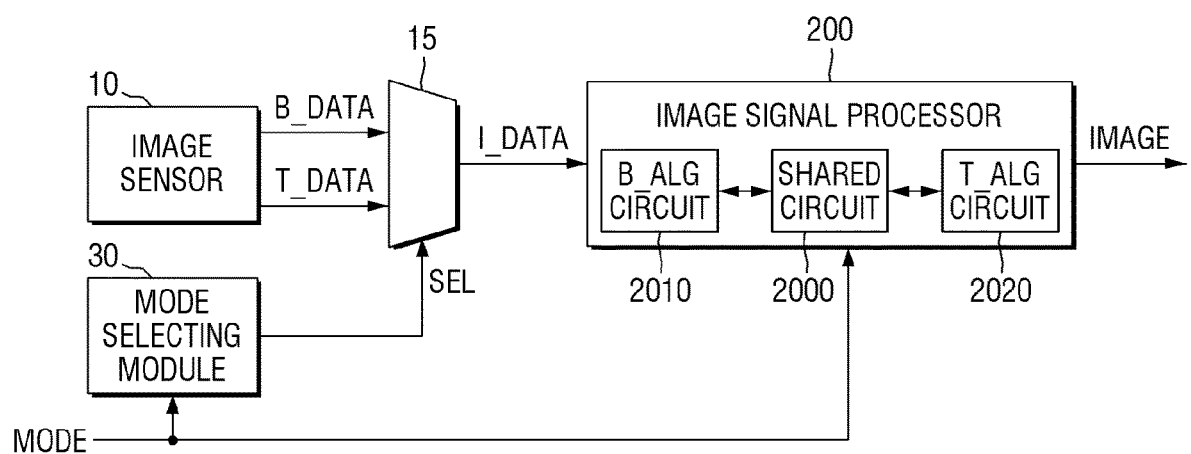
FIG. 2 is a diagram illustrating the image processing system according to an embodiment of the present disclosure.

FIG. 2 is a diagram illustrating an image processing system according to an embodiment of the present disclosure.

Referring to FIG. 2, the image processing system 2 according to an embodiment of the present disclosure includes an image sensor 10, a multiplexing circuit 15, a mode selecting module 30 and an image signal processor 200. Here, since the image sensor 10, the multiplexing circuit 15 and the mode selecting module 30 are substantially the same as the contents explained with reference to FIG. 1, repeated description will not be provided.

In the present embodiment, the image signal processor 200 includes a shared circuit 2000, a first algorithm circuit 2010 (a first circuit) and a second algorithm circuit 2020 (a second circuit).

The shared circuit 2000 is a circuit that processes the input image data I_DATA provided from the image sensor 10 through the multiplexing circuit 15. That is, the shared circuit 2000 is a circuit that executes at least one computation described above with reference to FIG. 1 on the input image data I_DATA. The shared circuit 2000 converts the input image data I_DATA into an image having, for example, RGB channels. The shared circuit 2000 is used in both cases of the first operation mode and the second operation mode, such that the first operation mode and the second operation mode share the shared circuit 2000.

The first algorithm circuit 2010 is a first circuit and is used by the shared circuit 2000 to process the input image data I_DATA with the first operation mode in the first shooting environment. In other words, in the first operation mode, the image signal processor 200 may process or be used to process the input image data I_DATA, using the shared circuit 2000, based on the first algorithm provided by the first algorithm circuit 2010 (the first circuit).

For example, in the bayer format processing mode, the image signal processor 200 may process the input image data I_DATA of bayer format, using the shared circuit 2000, based on the bayer format algorithm provided by the first algorithm circuit 2010 (the first circuit).

The second algorithm circuit 2020 is a second circuit and is used by the shared circuit 2000 to process the input image data I_DATA with the second operation mode in the second shooting environment. In other words, in the second operation mode, the image signal processor 200 may process or be used to process the input image data I_DATA, using the shared circuit 2000, based on the second algorithm provided by the second algorithm circuit 2020 (the second circuit).

For example, in the tetra format processing mode, the image signal processor 200 may process the input image data I_DATA of tetra format, using the shared circuit 2000, based on the tetra format algorithm provided by the second algorithm circuit 2020 (the second circuit).

That is, the shared circuit 2000 performs the computation itself such as a crosstalk compensation, a bad pixel correction, merging or reconstruction of multiple exposure pixels, demosaicing, noise reduction, image sharpening, an image stabilization, a color space conversion, and a compression equally in the first operation mode and the second operation mode. However, the shared circuit 2000 may receive only the algorithm for supporting the format of the input image data I_DATA from the algorithm circuits 2010 and 2020 depending on the respective operation modes.

Accordingly, since the image signal processor 200 according to the present embodiment may directly process the input image data I_DATA in each operation mode without executing the format conversion, it has an advantage capable of avoiding information loss and image quality degradation, while having a small chip size in its implementation by using a shared circuit without configuring individual image processing circuits for each format.

Figure 3:
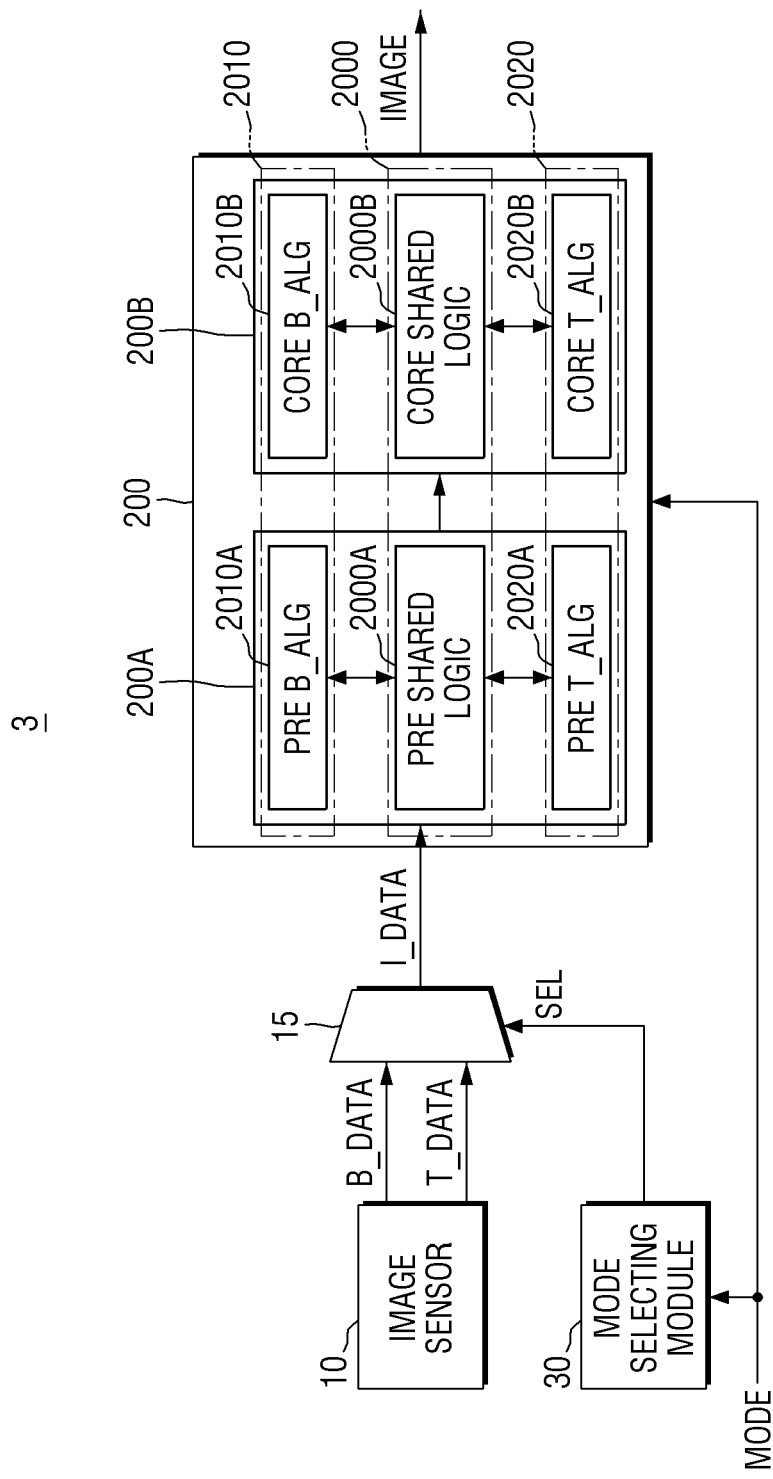
FIG. 3 is a diagram illustrating the image processing system according to an embodiment of the present disclosure.

FIG. 3 is a diagram illustrating an image processing system according to an embodiment of the present disclosure.

Referring to FIG. 3, an image processing system 3 according to an embodiment of the present disclosure includes an image sensor 10, a multiplexing circuit 15, a mode selecting module 30 and an image signal processor 200. Here, since the image sensor 10, the multiplexing circuit 15 and the mode selecting module 30 are substantially the same as the contents explained with reference to FIG. 1, the repeated contents will not be provided.

In the present embodiment, the image signal processor 200 includes a pre-processing module 200A and a core processing module 200B.

The pre-processing module 200A includes a pre-processing shared logic 2000A, a first pre-processing algorithm logic 2010A and a second pre-processing algorithm logic 2020A. Further, the core processing module 200B includes a core shared logic 2000B, a first core algorithm logic 2010B, and a second core algorithm logic 2020B. Each or any of the elements of the pre-processing module 200A or the core processing module 200B labelled as "logic" may be a software instantiation stored in and executed by the image signal processor 200. Alternatively, each of any of the elements of the pre-processing module 200A or the core processing module 200B labelled as "logic" may be implemented as a circuit such as an application-specific integrated circuit (ASIC).

On the other hand, the shared circuit 2000 includes a pre-processing shared logic 2000A and a core shared logic 2000B. Further, the first algorithm circuit 2010 (the first circuit) includes a first pre-processing algorithm logic 2010A and a first core algorithm logic 2010B. The second algorithm circuit 2020 (the second circuit) includes a second pre-processing algorithm logic 2020A and the second core algorithm logic 2020B. Each or any of the elements of the shared circuit 2000, the first algorithm circuit 2010 or the second algorithm circuit 2020 labelled as "logic" may be a software instantiation stored in and executed by the image signal processor 200. Alternatively, each of any of the elements of the shared circuit 2000, the first algorithm circuit 2010 or the second algorithm circuit 2020 labelled as "logic" may be implemented as a circuit such as an application-specific integrated circuit (ASIC).

The pre-processing shared logic 2000A performs pre-processing on the input image data I_DATA, by using the first pre-processing algorithm logic 2010A in the first operation mode, and by using the second pre-processing algorithm logic 2020A in the second operation mode. Here, the pre-processing may include processing such as crosstalk compensation, bad pixel correction, and merging or reconstruction of multiple exposure pixels, but the scope of the present disclosure is not limited thereto.

For example, in the bayer format processing mode, the image signal processor 200 performs or may perform the pre-processing of the input image data I_DATA of the bayer format, using the pre-processing shared logic 2000A based on the bayer format algorithm provided by the first pre-processing algorithm logic 2010A. Further, in the tetra format processing mode, the image signal processor 200 performs or may perform the pre-processing of the input image data I_DATA of the bayer format, using the pre-processing shared logic 2000A, based on the tetra format algorithm provided by the second pre-processing algorithm logic 2020A.

The core shared logic 2000B performs the core processing on input image data I_DATA, by using the first core algorithm logic 2010B in the first operation mode, and by using the second core algorithm logic 2020B in the second operation mode. Here, the core processing may include, for example, a demosaicing process, but the scope of the present disclosure is not limited thereto.

For example, in the bayer format processing mode, the image signal processor 200 processes the input image data I_DATA of the bayer format, using the core shared logic 2000B, based on the bayer format algorithm provided by the first core algorithm logic 2010B. Further, in the tetra format processing mode, the image signal processor 200 may process the input image data I_DATA of the bayer format, using the core shared logic 2000B, based on the tetra format algorithm provided by the second core algorithm logic 2020B.

As a result, since the image signal processor 200 according to the present embodiment may directly process the input image data I_DATA in each operation mode without executing the format conversion, it has an advantage capable of avoiding information loss and image quality degradation, while having a small chip size in its implementation, by using a shared circuit without configuring individual image processing circuits for each format.

Figure 4:
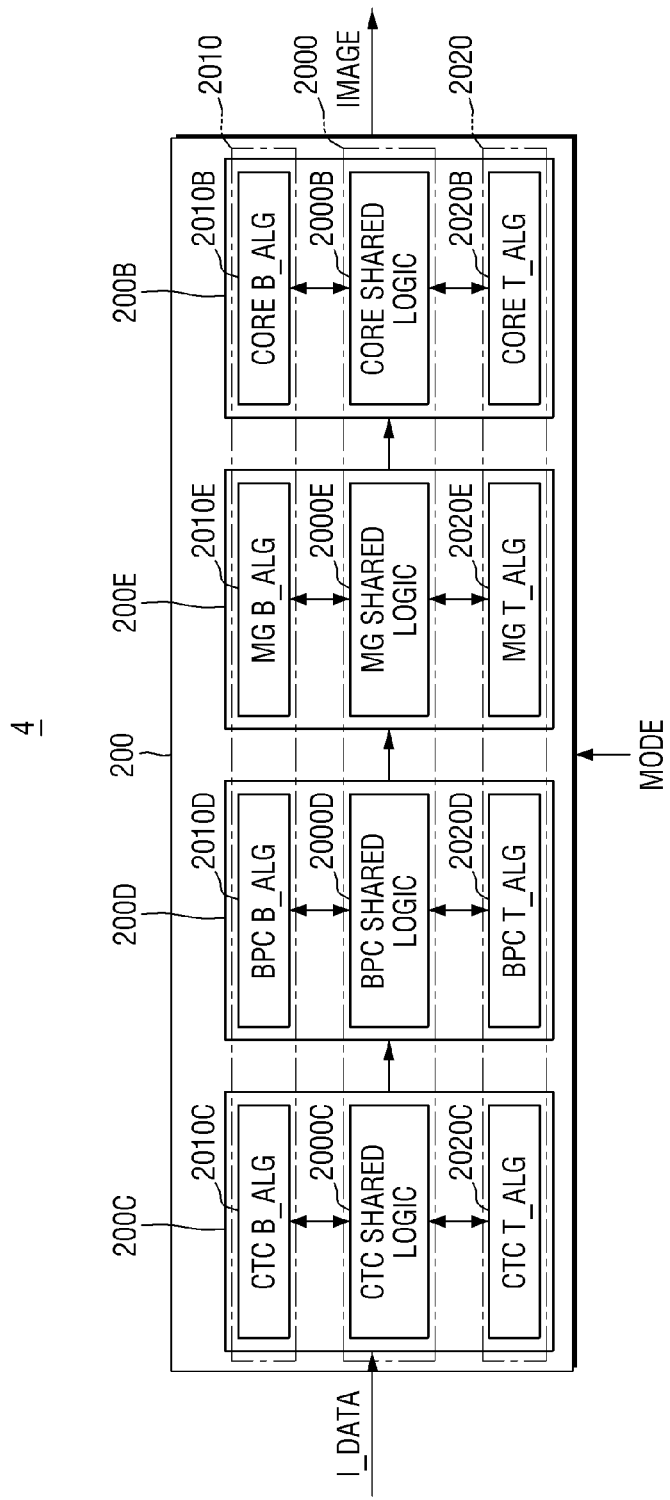
FIG. 4 is a diagram illustrating the image processing system according to an embodiment of the present disclosure.
Figure 5:
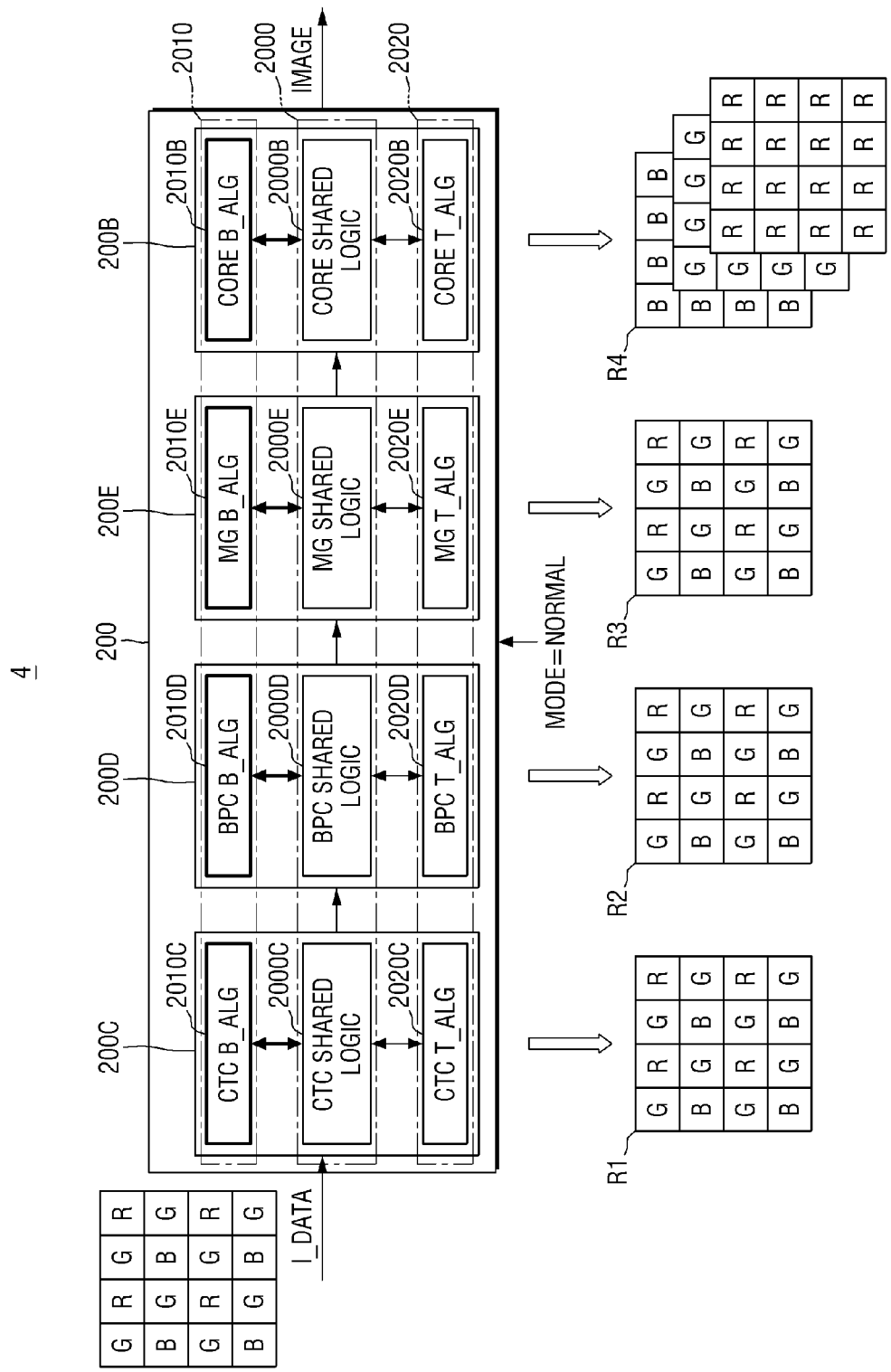
FIG. 5 is a diagram illustrating an operation example of the image processing system according to an embodiment of the present disclosure.
Figure 6:
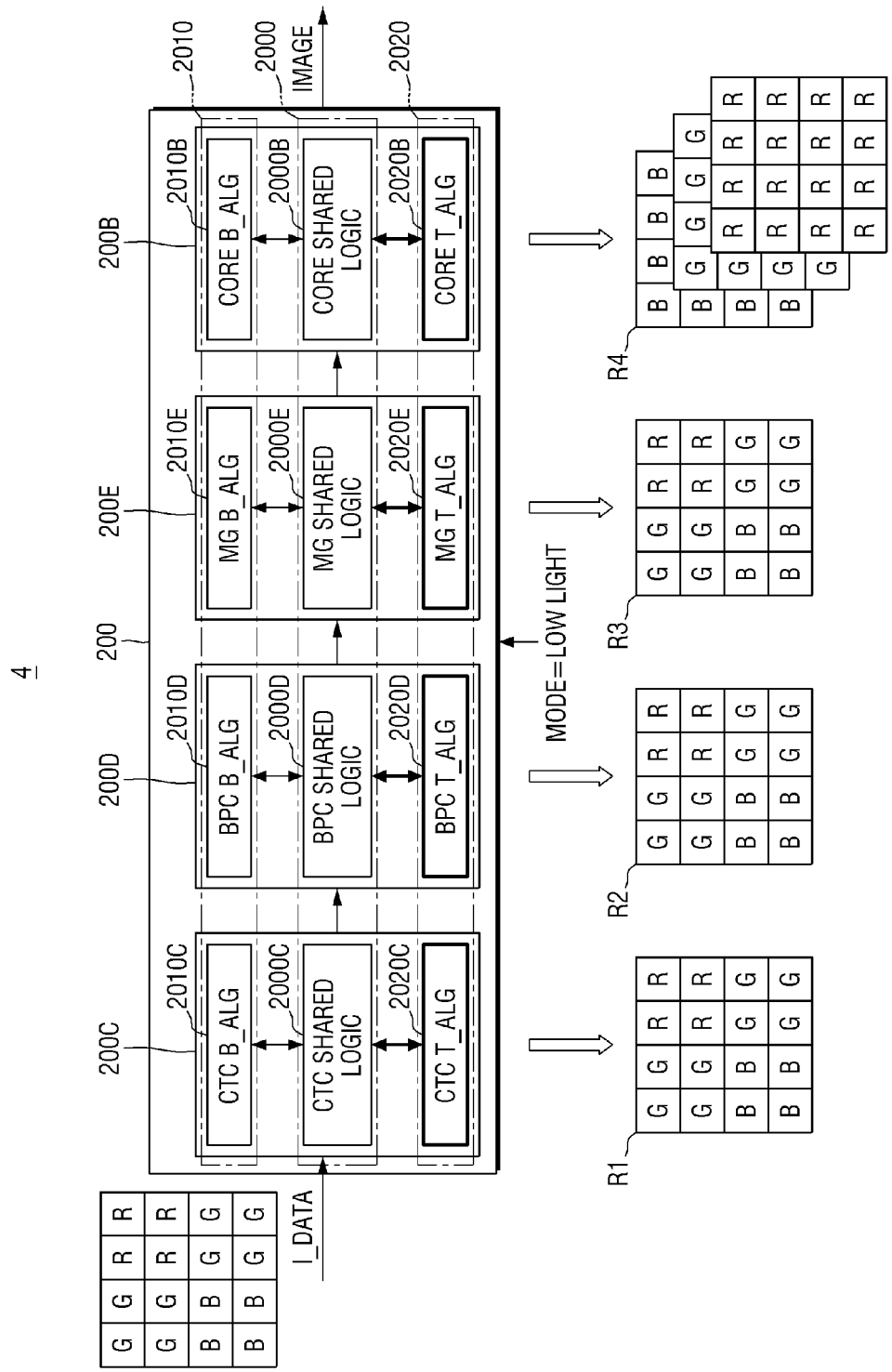
FIG. 6 is a diagram illustrating another operation example of the image processing system according to an embodiment of the present disclosure.

FIG. 4 is a diagram illustrating an image processing system according to an embodiment of the present disclosure. FIG. 5 is a diagram illustrating an operation example of the image processing system according to an embodiment of the present disclosure. FIG. 6 is a diagram illustrating another operation example of the image processing system according to an embodiment of the present disclosure.

Referring to FIG. 4, the image signal processor 200 of the image processing system 4 according to an embodiment of the present disclosure includes a first pre-processing sub-module 200C, a second pre-processing sub-module 200D, a third pre-processing sub-module 200E, and a core processing module 200B. In the present embodiment, for convenience of explanation, the first pre-processing sub-module 200C, the second pre-processing sub-module 200D and the third pre-processing sub-module 200E are illustrated, but the present disclosure is not limited thereto, and more or less than three pre-processing sub-modules may be provided.

The first pre-processing sub-module 200C includes a first pre-processing shared sub-logic 2000C, a first pre-processing algorithm sub-logic 2010C and a second pre-processing algorithm sub-logic 2020C. Each or any of the elements of the first pre-processing sub-module 200C labelled as "logic" may be a software instantiation stored in and executed by the image signal processor 200. Alternatively, each of any of the elements of the first pre-processing sub-module 200C labelled as "logic" may be implemented as a circuit such as an application-specific integrated circuit (ASIC).

The second pre-processing sub-module 200D includes a second pre-processing shared sub-logic 2000D, a third pre-processing algorithm sub-logic 2010D and a fourth pre-processing algorithm sub-logic 2020D. Each or any of the elements of the second pre-processing sub-module 200D labelled as "logic" may be a software instantiation stored in and executed by the image signal processor 200. Alternatively, each of any of the elements of the second pre-processing sub-module 200D labelled as "logic" may be implemented as a circuit such as an application-specific integrated circuit (ASIC).

The third pre-processing sub-module 200E includes a third pre-processing shared sub-logic 2000E, a fifth pre-processing algorithm sub-logic 2010E and a sixth pre-processing algorithm sub-logic 2020E. Each or any of the elements of the third pre-processing sub-module 200E labelled as "logic" may be a software instantiation stored in and executed by the image signal processor 200. Alternatively, each of any of the elements of the third pre-processing sub-module 200E labelled as "logic" may be implemented as a circuit such as an application-specific integrated circuit (ASIC).

Further, the core processing module 200B includes a core shared logic 2000B, a first core algorithm logic 2010B, and the second core algorithm logic 2020B. Each or any of the elements of the core processing module 200B labelled as "logic" may be a software instantiation stored in and executed by the image signal processor 200. Alternatively, each of any of the elements of the core processing module 200B labelled as "logic" may be implemented as a circuit such as an application-specific integrated circuit (ASIC).

On the other hand, the shared circuit 2000 includes pre-processing shared sub-logics 2000C, 2000D and 2000E, and a core shared logic 2000B. Each or any of the elements of the shared circuit 2000 labelled as "logic" may be a software instantiation stored in and executed by the image signal processor 200. Alternatively, each of any of the elements of the shared circuit 2000 labelled as "logic" may be implemented as a circuit such as an application-specific integrated circuit (ASIC). Further, the first algorithm circuit 2010 (the first circuit) includes the first pre-processing algorithm sub-logic 2010C, the third pre-processing algorithm sub-logic 2010D, the fifth pre-processing algorithm sub-logic 2010E, and the first core algorithm logic 2010B. The second algorithm circuit 2020 (the second circuit) includes the second pre-processing algorithm sub-logic 2020C, the fourth pre-processing algorithm sub-logic 2020D, the sixth pre-processing algorithm sub-logic 2020E, and the second core algorithm logic 2020B. Each or any of the elements of the first algorithm circuit 2010 (the first circuit) and/or the second algorithm circuit 2020 (the second circuit) labelled as "logic" may be a software instantiation stored in and executed by the image signal processor 200. Alternatively, each of any of the elements of the first algorithm circuit 2010 (the first circuit) and/or the second algorithm circuit 2020 (the second circuit) labelled as "logic" may be implemented as a circuit such as an application-specific integrated circuit (ASIC).

The first pre-processing shared sub-logic 2000C performs the first pre-processing on the input image data I_DATA, by using the first pre-processing algorithm sub-logic 2010C in the first operation mode, and by using the second pre-processing algorithm sub-logic 2020C in the second operation mode. Here, the first pre-processing may include, for example, a process of crosstalk compensation, but the scope of the present disclosure is not limited thereto.

The second pre-processing shared sub-logic 2000D performs the second pre-processing on the input image data I_DATA, by using the third pre-processing algorithm sub-logic 2010D in the first operation mode, and by using the fourth pre-processing algorithm sub-logic 2020D in the second operation mode. Here, the second pre-processing may include, for example, processing of bad pixel correction, but the scope of the present disclosure is not limited thereto.

The third pre-processing shared sub-logic 2000E performs the third pre-processing on the input image data I_DATA, by using the fifth pre-processing algorithm sub-logic 2010E in the first operation mode, and by using the sixth pre-processing algorithm sub-logic 2020E in the second operation mode. Here, the third pre-processing may include, for example, processing of merging or reconstruction of multiple exposure pixels, but the scope of the present disclosure is not limited thereto.

The core shared logic 2000B performs the core processing on the input image data I_DATA, by using the first core algorithm logic 2010B in the first operation mode, and by using the second core algorithm logic 2020B in the second operation mode. Here, the core processing may include, for example, a demosaicing process, but the scope of the present disclosure is not limited thereto.

Next, referring to FIG. 5, in the bayer format processing mode, the image signal processor 200 may perform the first pre-processing of the crosstalk compensation on the input image data I_DATA of the bayer format, using the first pre-processing shared sub-logic 2000C, based on the bayer format algorithm provided by the first pre-processing algorithm sub-logic 2010C. As a result, image data R1 may be generated.

Further, the image signal processor 200 may perform the second pre-processing of bad pixel correction on the input image data I_DATA of the bayer format in which the first pre-processing has been completed, using the second pre-processing shared sub-logic 2000D, based on the bayer format algorithm provided by the third pre-processing algorithm sub-logic 2010D. As a result, image data R2 may be generated.

Further, the image signal processor 200 may perform the third pre-processing of merging or reconstruction of the multiple exposure pixels on the input image data I_DATA of the bayer format in which the second pre-processing has been completed, using the third pre-processing shared sub-logic 2000E, based on the bayer format algorithm provided by the fifth pre-processing algorithm sub-logic 2010E. As a result, image data R3 may be generated.

Further, the image signal processor 200 may perform the core processing of the demosaicing on the input image data I_DATA of the bayer format in which the first to third pre-processing has been completed, using the core shared logic 2000B, based on the bayer format algorithm provided by the first core algorithm logic 2010B. As a result, image data R4 may be generated.

Next, referring to FIG. 6, in the tetra format processing mode, the image signal processor 200 may perform the first pre-processing of crosstalk compensation on the input image data I_DATA of tetra format, using the first pre-processing shared sub-logic 2000C, based on the tetra format algorithm provided by the second pre-processing algorithm sub-logic 2020C. As a result, image data R1 may be generated.

Further, the image signal processor 200 may perform the second pre-processing of the bad pixel correction on the input image data I_DATA of the tetra format in which the first pre-processing has been completed, using the second pre-processing shared sub-logic 2000D, based on the tetra format algorithm provided by the fourth pre-processing algorithm sub-logic 2020D. As a result, image data R2 may be generated.

Further, the image signal processor 200 may perform the third pre-processing of merging or reconstruction of multiple exposure pixels on the input image data I_DATA of the tetra format in which the second pre-processing has been completed, using the third pre-processing shared sub-logic 2000E, based on the tetra format algorithm provided by the sixth pre-processing algorithm sub-logic 2020E. As a result, image data R3 may be generated.

Further, the image signal processor 200 performs the core processing of the demosaicing on the input image data I_DATA of the tetra format in which the first to third pre-processing have been completed, using the core shared logic 2000B, based on the tetra format algorithm provided by the second core algorithm logic 2020B. As a result, image data R4 may be generated.

As a result, since the image signal processor 200 according to the present embodiment may directly process the input image data I_DATA in each operation mode without executing the format conversion, it has an advantage capable of avoiding information loss and image quality degradation, while having a small chip size in its implementation by using a shared circuit without configuring individual image processing circuits for each format.

Figure 7:
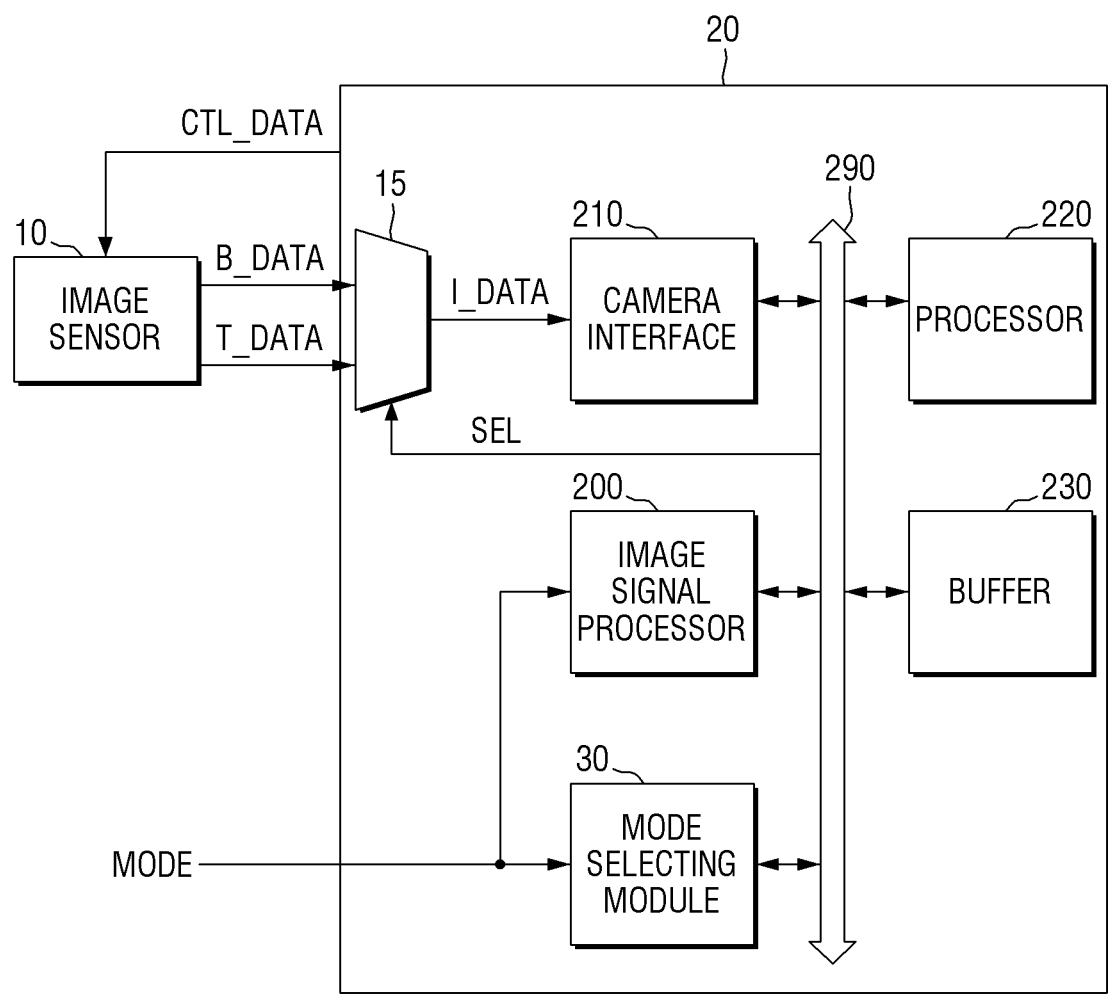
FIG. 7 is a diagram illustrating another image processing system according to an embodiment of the present disclosure.

FIG. 7 is a diagram illustrating another image processing system according to an embodiment of the present disclosure.

Referring to FIG. 7, unlike the image processing system 1 according to the embodiment of FIG. 1, in an image processing system 5 according to an embodiment of the present disclosure, the multiplexing circuit 15 and the mode selecting module 30 are implemented inside the SoC 20.

That is, the SoC 20 further includes the multiplexing circuit 15 and the mode selecting module 30, in addition to the image signal processor 200, the camera interface 210, the processor 220 and the buffer 230. The SoC 20 is configured so that the image signal processor 200, the camera interface 210, the processor 220, the buffer 230, the multiplexing circuit 15 and the mode selecting module 30 may exchange data with each other via an internal bus 290.

In particular, the selection signal SEL which is output by the mode selecting module 30 for controlling the multiplexing circuit 15 may be transmitted to the multiplexing circuit 15 via the internal bus 290 of the SoC 20.

However, this embodiment is merely an example of various embodiments of the present disclosure. That is, the multiplexing circuit 15 and the mode selecting module 30 may both be implemented outside the SoC 20 as illustrated in FIG. 1. Alternatively, the multiplexing circuit 15 may be implemented inside the SoC 20 as in this embodiment of FIG. 7, and the mode selecting module 30 may be implemented outside of the SoC 20. In another embodiment, the mode selecting module 30 may be implemented inside the SoC 20 as in this embodiment of FIG. 7, and the multiplexing circuit 15 may be implemented outside the SoC 20.

Figure 8:
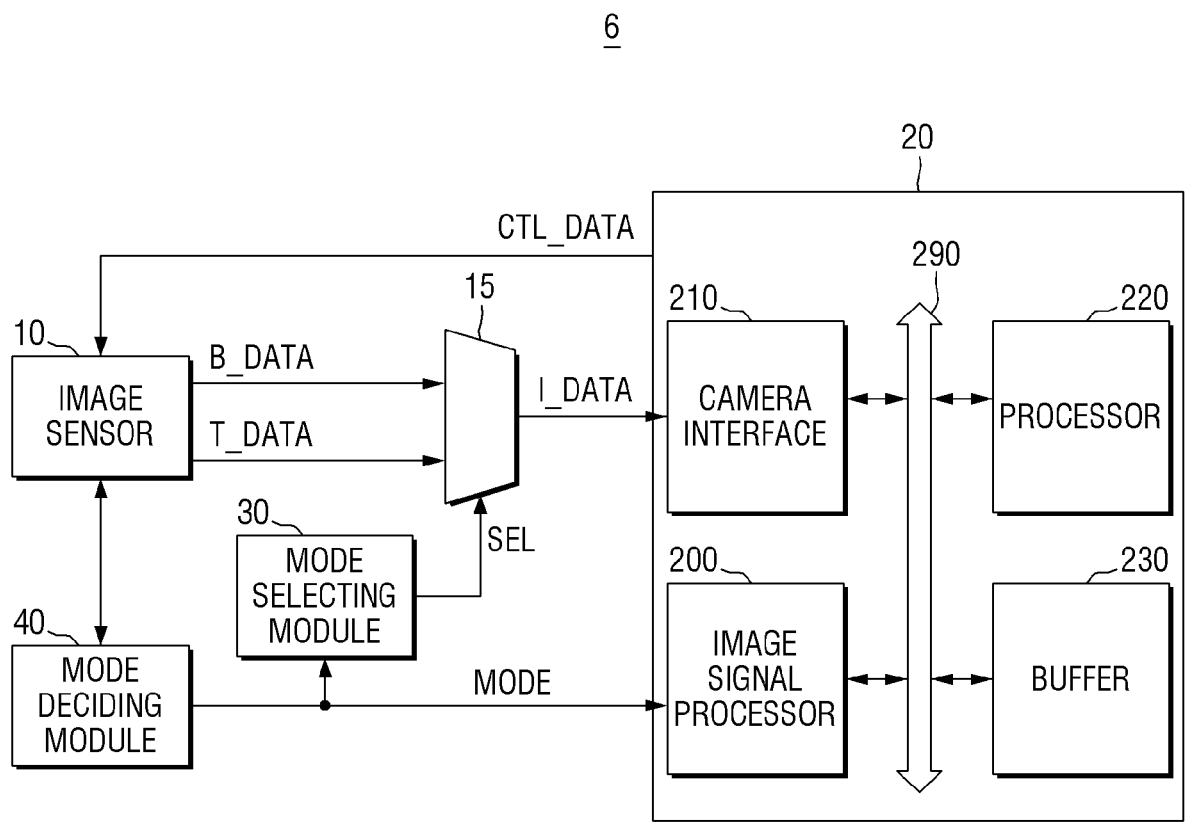
FIG. 8 is a diagram illustrating another image processing system according to an embodiment of the present disclosure.

FIG. 8 is a diagram illustrating another image processing system according to an embodiment of the present disclosure.

Referring to FIG. 8, an image processing system 6 according to an embodiment of the present disclosure further includes a mode deciding module 40, unlike the image processing system 1 according to the embodiment of FIG. 1. For convenience of explanation, the mode deciding module 40 is illustrated as being implemented outside the SoC 20 in the present embodiment, but the scope of the present disclosure is not limited thereto, and the mode deciding module 40 may also be implemented inside the SoC 20.

The mode deciding module 40 detects the shooting environment based on the information provided from the image sensor 10. The mode deciding module may decide the operation mode of the image signal processor 200 as either one of the first operation mode and the second operation mode.

Specifically, the image sensor 10 may detect characteristics of the shooting environment and generate and collect information regarding the characteristics of the shooting environment. For example, the image sensor 10 may collect data obtained by sensing characteristics such as the light quantity of the shooting environment.

In this case, based on the light quantity information collected by the image sensor 10, the mode deciding module 40 may decide the operation mode as the bayer format processing mode when the light quantity is sufficient. In contrast, the mode deciding module 40 may decide the operation mode as the tetra format processing mode when the light quantity is insufficient. In an embodiment, the mode deciding module 40 may compare a predetermined threshold value with the data value of the light quantity information and/or each other characteristic(s) provided from the image sensor 10 to decide whether the light quantity is insufficient. The mode deciding module 40 may decide the operation mode as a decided operation mode accordingly.

In the present embodiment, the information provided from the image sensor 10 has been described as the light quantity information, but the scope of the present disclosure is not limited thereto, and the information provided from the image sensor 10 may include any type of sensing data that enables the shooting information to be recognized.

During operation of the image processing system 6, the mode deciding module 40 may change the operation mode between the first operation mode and the second operation mode. For example, when the shooting environment is switched from the daytime outdoor into the nighttime indoor, the mode deciding module 40 may dynamically change the operation mode from the first operation mode to the second operation mode during the operation of the image processing system 6.

As a result, since the image signal processor 200 according to the present embodiment may directly process the input image data I_DATA in each operation mode without executing the format conversion, it has an advantage capable of avoiding information loss and image quality degradation, while having a small chip size in its implementation, by using a shared circuit without configuring individual image processing circuits for each format. Furthermore, the delay that may occur when the operation mode is changed may also be minimized.

Figure 9:
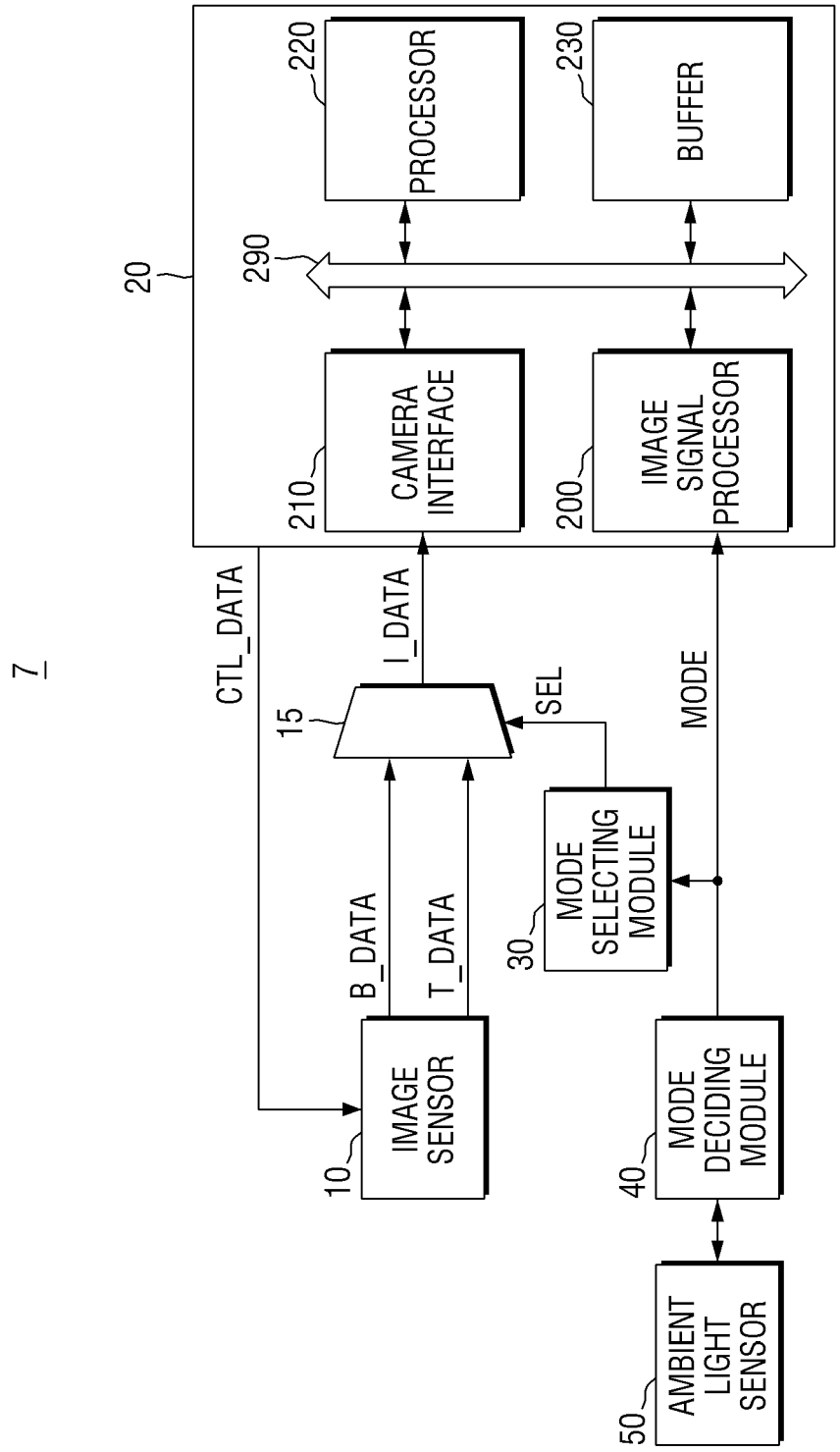
FIG. 9 is a diagram illustrating another image processing system according to an embodiment of the present disclosure.

FIG. 9 is a diagram illustrating another image processing system according to an embodiment of the present disclosure.

Referring to FIG. 9, unlike the image processing system 1 according to the embodiment of FIG. 1, the image processing system 7 according to an embodiment of the present disclosure further includes a mode deciding module 40 and an ambient light sensor 50. For convenience of explanation, the mode deciding module 40 is illustrated as being implemented outside the SoC 20 in the present embodiment, but the scope of the present disclosure is not limited thereto, and the mode deciding module 40 may also be implemented inside the SoC 20.

The mode deciding module 40 detects the shooting environment based on the information provided from the ambient light sensor 50. The mode deciding module 40 may decide the operation mode of the image signal processor 200 is one of the first operation mode and the second operation mode.

Specifically, the ambient light sensor 50 may detect characteristics of the shooting environment such as the light quantity of the shooting environment. The ambient light sensor 50 may collect data obtained by sensing the light quantity of the shooting environment.

In this case, based on the light quantity information collected by the ambient light sensor 50, when the light quantity is sufficient, the mode deciding module 40 may decide the operation mode to be the bayer format processing mode. In contrast, when the light quantity is insufficient, the mode deciding module 40 may decide the operation mode to be the tetra format processing mode. In an embodiment, the mode deciding module 40 may compare the previously decided threshold value with the data value of the light quantity information provided from the ambient light sensor 50 to decide whether the light quantity is sufficient or insufficient. The mode deciding module may decide the operation mode accordingly.

The mode deciding module 40 may change the operation mode between the first operation mode and the second operation mode during the operation of the image processing system 7. For example, when the shooting environment is switched from the daytime outdoor into the nighttime indoor, the mode deciding module 40 may dynamically change the operation mode from the first operation mode to the second operation mode during the operation of the image processing system 6.

Thus, since the image signal processor 200 according to the present embodiment may directly process the input image data I_DATA in each operation mode without executing the format conversion, it has an advantage capable of avoiding information loss and image quality degradation, while having a small chip size in its implementation, by using a shared circuit without configuring individual image processing circuits for each format. Furthermore, the delay that may occur when the operation mode is changed may also be minimized.

Figure 10:
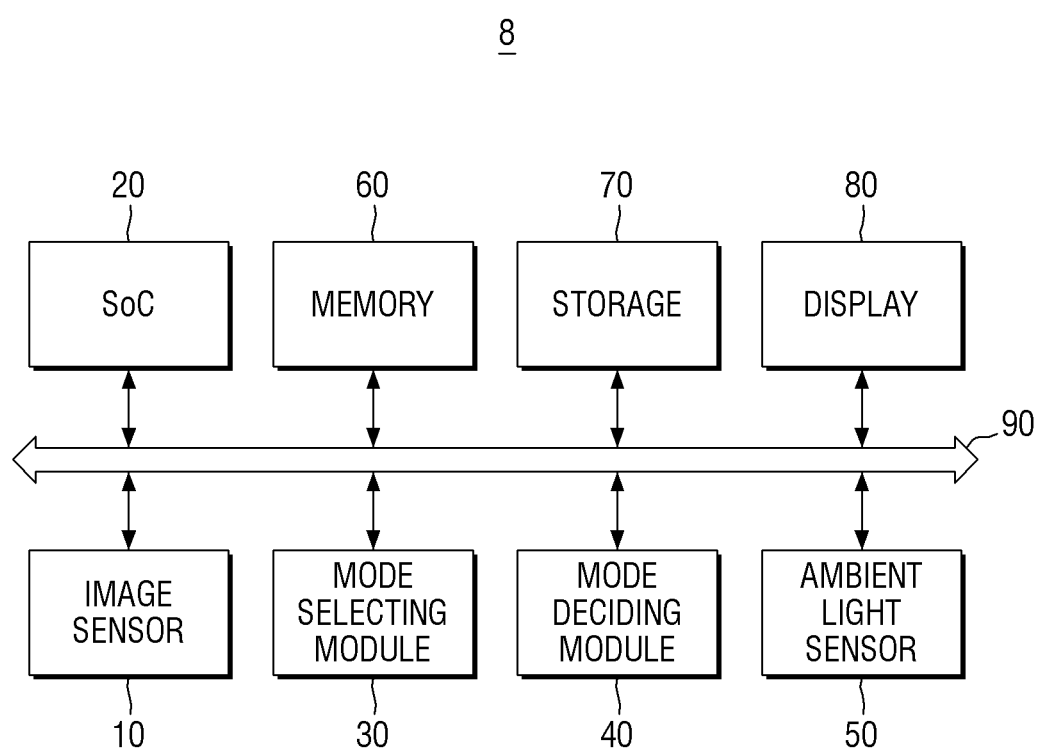
FIG. 10 is a diagram illustrating the image processing system according to an embodiment of the present disclosure.

FIG. 10 is a diagram illustrating an image processing system according to an embodiment of the present disclosure.

Referring to FIG. 10, an image processing system 8 according to one embodiment of the present disclosure may be implemented as a computing device that includes the image sensor 10, the SoC 20, the mode selecting module 30, the mode deciding module 40, the ambient light sensor 50, the memory 60, the storage 70 and the display 80. The image sensor 10, the SoC 20, the mode selecting module 30, the mode deciding module 40, the ambient light sensor 50, the memory 60, the storage 70 and the display 80 may exchange data with each other via the bus 90.

Figure 11:
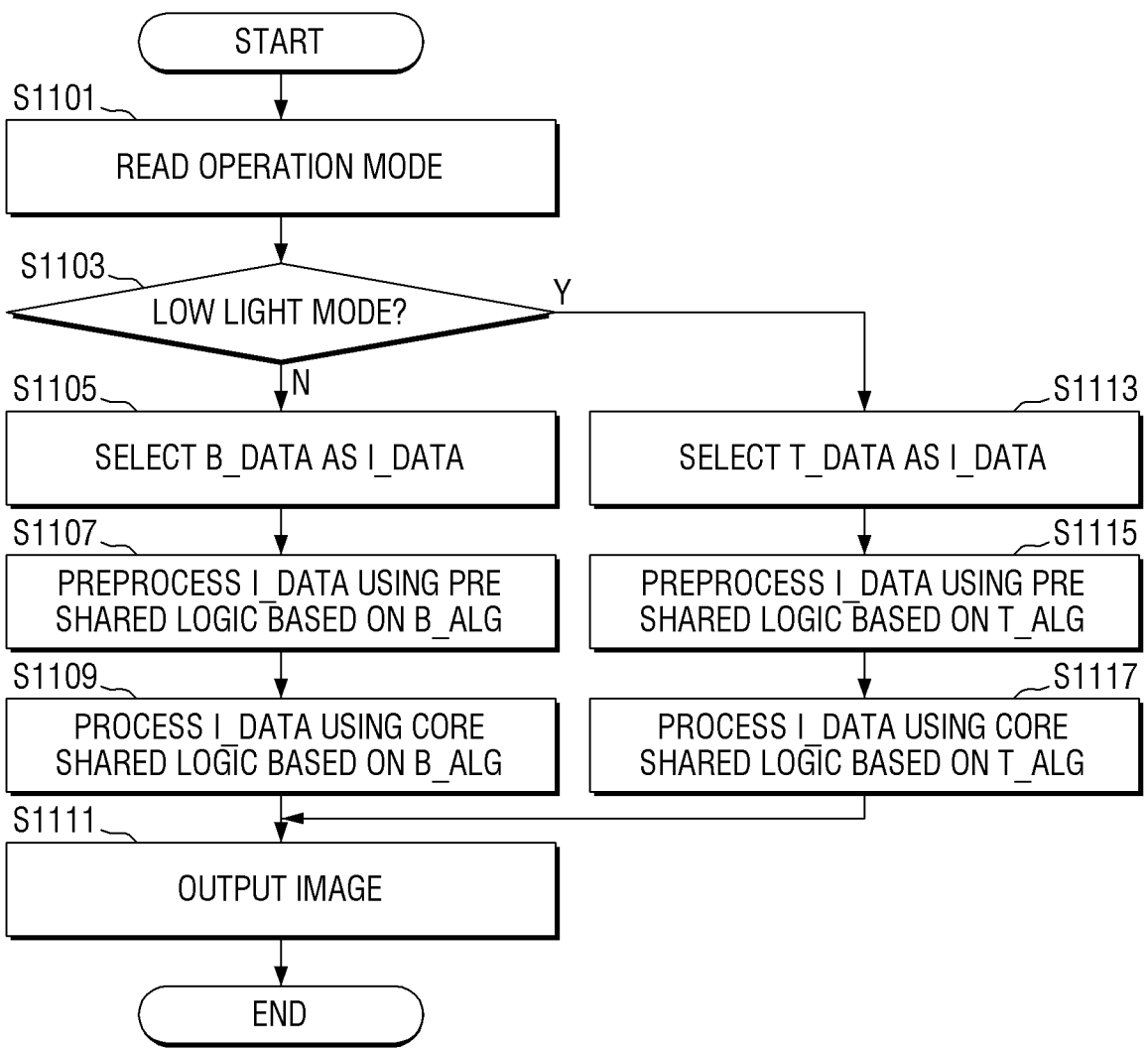
FIG. 11 is a flowchart illustrating an operating method of an image signal processor according to an embodiment of the present disclosure.

FIG. 11 is a flowchart illustrating an operating method of an image signal processor according to an embodiment of the present disclosure.

Referring to FIG. 11, the operating method of the image signal processor according to the embodiment of the present disclosure includes reading at S1101 a predetermined operation mode signal MODE to set the operation mode for processing the input image data I_DATA.

Further, the method includes determining at S1103 whether the operation mode is the second operation mode (low light mode).

When the operation mode is not the second operation mode (low light mode) (S1103=No), that is, when the operation mode is the first operation mode (normal mode), the method of FIG. 11 includes selecting at S1105 the first format image data B_DATA provided from the image sensor 10 as the input image data I_DATA.

Further, the method of FIG. 11 includes pre-processing at S1107 the input image data I_DATA of the first format, using the pre-processing shared logic 2000A, based on the algorithm for the first format (Bayer format) provided by the first pre-processing algorithm logic 2010A.

In addition, the method of FIG. 11 includes the core-processing at S1109 of the input image data I_DATA of the first format in which the pre-processing has been completed at S1107, using the core shared logic 2000B, based on the first format algorithm provided by the first core algorithm logic 2010B.

When the operation mode is the second operation mode (low light mode) (S1103=Y), the method of FIG. 11 includes selecting at S1113 of the second format image data T_DATA provided from the image sensor 10 as the input image data I_DATA.

In addition, the method of FIG. 11 includes pre-processing at S1115 of the input image data I_DATA of the second format, using the pre-processing shared logic 2000A, based on the algorithm for the second format (tetra format) provided by the second pre-processing algorithm logic 2020A.

In addition, the method of FIG. 11 includes the core-processing at S1117 of the input image data I_DATA of the second format in which the pre-processing has been completed at S1115, using the core shared logic 2000B, based on the second format algorithm provided by the second core algorithm logic 2020B.

In addition, the method of FIG. 11 includes outputting at S1111 of an image in which the core processing has been completed at either S1109 or S1117.

Figure 12:
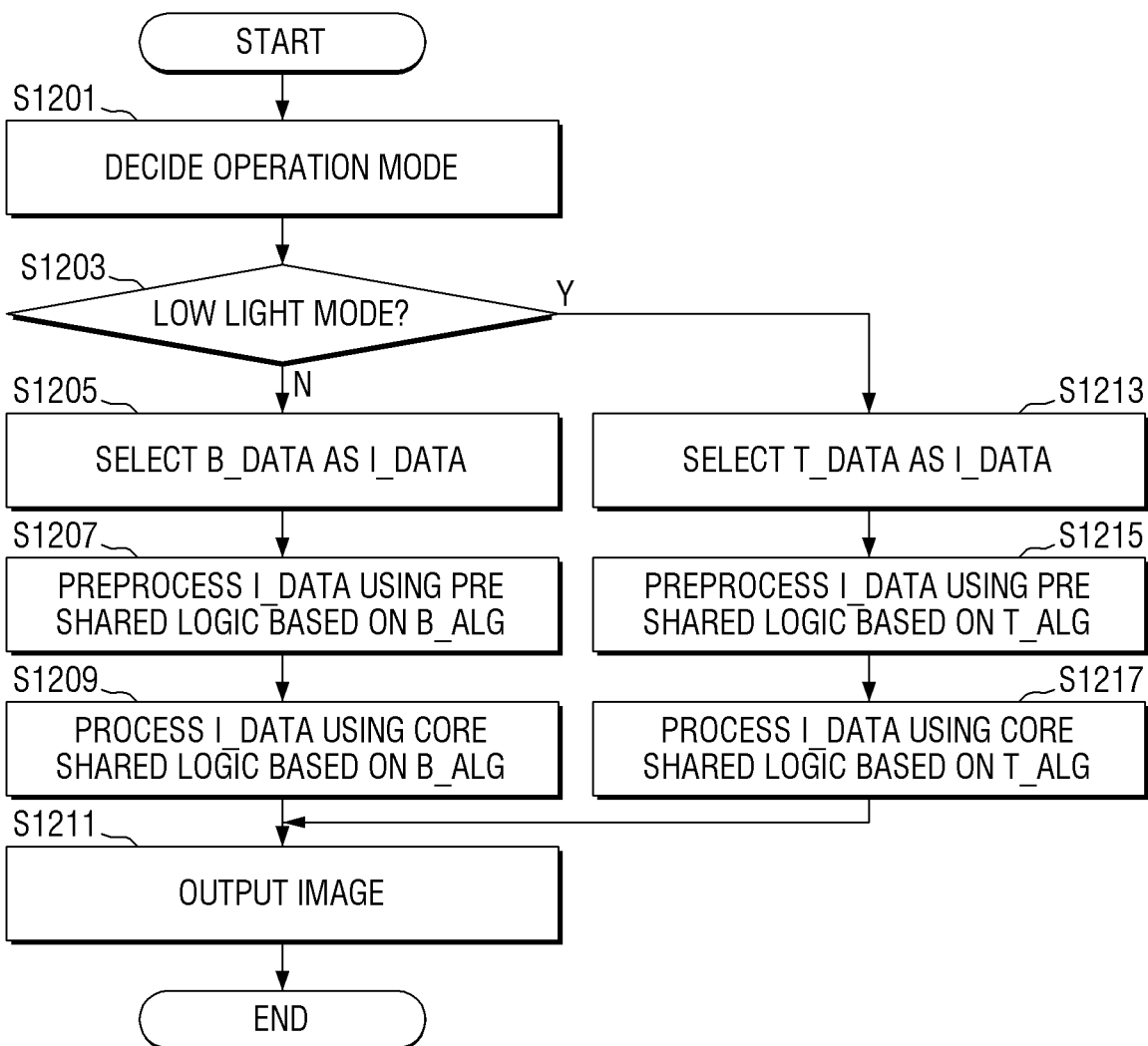
FIG. 12 is a flowchart illustrating another operating method of an image signal processor according to an embodiment of the present disclosure.

FIG. 12 is a flowchart illustrating another operating method of the image signal processor according to an embodiment of the present disclosure.

Referring to FIG. 12, an operating method of an image signal processor according to an embodiment of the present disclosure includes determining at S1201 of an operation mode for processing the input image data I_DATA, based on information provided from the image sensor 10 or the ambient light sensor 50.

Further, the method of FIG. 12 includes determining at S1203 whether the operation mode is the second operation mode (low light mode).

When the operation mode is not the second operation mode (low light mode) (S1203=No), that is, when the operation mode is the first operation mode (normal mode), the method of FIG. 12 includes selecting at S1205 of the first format image data B_DATA provided from the image sensor 10 as the input image data I_DATA.

Further, the method of FIG. 12 includes pre-processing at S1207 of the input image data I_DATA of the first format, using the pre-processing shared logic 2000A, based on the algorithm for the first format (Bayer format) provided by the first pre-processing algorithm logic 2010A.

Further, the method of FIG. 12 includes core-processing at S1209 of the input image data I_DATA of the first format in which the pre-processing has been completed at S1207, using the core shared logic 2000B, based on the first format algorithm provided by the first core algorithm logic 2010B.

When the operation mode is the second operation mode (low light mode) (S1203=Y), the method of FIG. 12 includes selecting at S1213 of the second format image data T_DATA provided from the image sensor 10 as the input image data I_DATA.

In addition, the method of FIG. 12 includes pre-processing at S1215 of the input image data I_DATA of the second format, using the pre-processing shared logic 2000A, based on the algorithm for the second format (tetra format) provided by the second pre-processing algorithm logic 2020A.

In addition, the method of FIG. 12 includes core-processing at S1217 of the input image data I_DATA of the second format in which the pre-processing has been completed at S1215, using the core shared logic 2000B, based on the second format algorithm provided by the second core algorithm logic 2020B.

Further, the method of FIG. 12 includes outputting at S1211 of an image in which the core processing has been completed at S1209 or at S1217.

In concluding the detailed description, those skilled in the art will appreciate that many variations and modifications may be made to the preferred embodiments without substantially departing from the principles of the present disclosure. Therefore, the disclosed preferred embodiments of the disclosure are used in a generic and descriptive sense only and not for purposes of limitation.

What is claimed is:

1. An image signal processor, comprising:
    a shared circuit which processes input image data and comprises a core shared logic;
    a first circuit that provides, to the shared circuit, a first algorithm which is used by the shared circuit to process the input image data at a bayer format processing mode in a normal environment; and
    a second circuit, different from the first circuit, that provides, to the shared circuit, a second algorithm which is used by the shared circuit to process the input image data at a tetra format processing mode in a low light environment,
    wherein the core shared logic performs core processing on the input image data, by using a first core algorithm logic providing bayer format algorithm in the bayer format processing mode, and by using a second core algorithm logic providing tetra format algorithm in the tetra format processing mode.

2. The image signal processor of claim 1, further comprising:
    a mode selecting module which selects bayer format image data provided from an image sensor in the bayer format processing mode, as the input image data, and selects tetra format image data provided from the image sensor in the tetra format processing mode, as the input image data.

3. The image signal processor of claim 1, wherein the shared circuit further comprises a pre-processing shared logic, and
    the pre-processing shared logic performs pre-processing on the input image data, by using a first pre-processing algorithm logic in the bayer format processing mode, and by using a second pre-processing algorithm logic in the tetra format processing mode.

4. The image signal processor of claim 3, wherein the pre-processing shared logic, the first pre-processing algorithm logic, and the second pre-processing algorithm logic are included in a pre-processing module, and
    the core shared logic, the first core algorithm logic, and the second core algorithm logic are included in a core processing module.

5. The image signal processor of claim 3, wherein the pre-processing shared logic includes a first pre-processing shared sub-logic and a second pre-processing shared sub-logic,
    the first pre-processing algorithm logic includes a first pre-processing algorithm sub-logic and a third pre-processing algorithm sub-logic,
    the second pre-processing algorithm logic includes a second pre-processing algorithm sub-logic and a fourth pre-processing algorithm sub-logic,
    the first pre-processing shared sub-logic performs first pre-processing on the input image data, by using the first pre-processing algorithm sub-logic in the bayer format processing mode, and by using the second pre-processing algorithm sub-logic in the tetra format processing mode, and
    the second pre-processing shared sub-logic performs second pre-processing different from the first pre-processing on the input image data, by using the third pre-processing algorithm sub-logic in the bayer format processing mode, and by using the fourth pre-processing algorithm sub-logic in the tetra format processing mode.

6. The image signal processor of claim 5, wherein the first pre-processing shared sub-logic, the first pre-processing algorithm sub-logic and the second pre-processing algorithm sub-logic are included in a first pre-processing sub-module, and
    the second pre-processing shared sub-logic, the third pre-processing algorithm sub-logic, and the fourth pre-processing algorithm sub-logic are included in a second pre-processing sub-module.

7. The image signal processor of claim 3, wherein the pre-processing includes at least one of crosstalk compensation, bad pixel correction, and merging or reconstruction of multiple exposure pixels.

8. The image signal processor of claim 1, wherein the core processing includes demosaicing process.

9. The image signal processor of claim 1, further comprising:
    a mode deciding module which decides one of the bayer format processing mode and the tetra format processing mode, based on information provided from an image sensor.

10. The image signal processor of claim 1, further comprising:
    a mode deciding module which decides one of the bayer format processing mode and the tetra format processing mode, based on information provided from an ambient light sensor.

11. An image processing system, comprising:
    an image signal processor which includes a shared circuit configured to process input image data and comprising a core shared logic, and a plurality of algorithmic circuits configured to provide, to the shared circuit, algorithms which are used to process the input image data in different operation modes depending on a shooting environment; and
    a mode deciding module which detects the shooting environment by comparing predetermined threshold value with light quantity information provided from an image sensor or an ambient light sensor and which decides an operation mode of the image signal processor as a decided operation mode,
    wherein the plurality of algorithm circuits includes a first circuit which provides a first algorithm to the shared circuit and which is used by the shared circuit to process the input image data at a normal mode in a normal environment, and a second circuit which provides a second algorithm to the shared circuit and which is used by the shared circuit to process the input image data at a low light mode in a low light environment, and wherein the core shared logic performs core processing on the input image data, by using a first core algorithm logic providing bayer format algorithm in the normal mode, and by using a second core algorithm logic providing tetra format algorithm in the low light mode.

12. The image processing system of claim 11, further comprising:
a mode selecting module which selects one of bayer format image data and tetra format image data provided from the image sensor, as the input image data, depending on the decided operation mode.

13. The image processing system of claim 11, wherein the shared circuit further comprises a pre-processing shared logic,
the pre-processing shared logic performs pre-processing on the input image data, by using a first pre-processing algorithm logic in the normal mode, and by using a second pre-processing algorithm logic in the low light mode.

14. The image processing system of claim 13, wherein the pre-processing shared logic, the first pre-processing algorithm logic, and the second pre-processing algorithm logic are included in a pre-processing module, and
the core shared logic, the first core algorithm logic, and the second core algorithm logic are included in a core processing module.

15. The image signal processor of claim 13, wherein the pre-processing includes at least one of crosstalk compensation, bad pixel correction, and merging or reconstruction of multiple exposure pixels.

16. The image processing system of claim 13, wherein the pre-processing shared logic includes a first pre-processing shared sub-logic and a second pre-processing shared sub-logic,
the first pre-processing algorithm logic includes a first pre-processing algorithm sub-logic and a third pre-processing algorithm sub-logic,
the second pre-processing algorithm logic includes a second pre-processing algorithm sub-logic and a fourth pre-processing algorithm sub-logic,
the first pre-processing shared sub-logic performs the first pre-processing on the input image data, by using the first pre-processing algorithm sub-logic in the normal mode, and by using the second pre-processing algorithm sub-logic in the low light mode, and
the second pre-processing shared sub-logic performs the second pre-processing different from the first pre-processing on the input image data, by using the third pre-processing algorithm sub-logic in the normal mode, and by using the fourth pre-processing algorithm sub-logic in the low light mode.

17. The image processing system of claim 16, wherein the first pre-processing shared sub-logic, the first pre-processing algorithm sub-logic and the second pre-processing algorithm sub-logic are included in a first pre-processing sub-module, and
the second pre-processing shared sub-logic, the third pre-processing algorithm sub-logic, and the fourth pre-processing algorithm sub-logic are included in a second pre-processing sub-module.

18. The image signal processor of claim 11, wherein the core processing includes demosaicing process.

19. An operating method of an image signal processor, comprising:
setting an operation mode for processing input image data by comparing predetermined threshold value with light quantity information provided from an image sensor or an ambient light sensor;
selecting bayer format image data provided from an image sensor as the input image data, when the operation mode is a bayer format processing mode;
selecting tetra format image data provided from the image sensor as the input image data, when the operation mode is a tetra format processing mode;
processing the input image data, using a first circuit, which provides a first algorithm for processing the input image data, when the operation mode is the bayer format processing mode; and
processing the input image data, using a second circuit, different from the first circuit, which provides a second algorithm for processing the input image data, when the operation mode is the tetra format processing mode,
wherein processing the input image data, using the first circuit when the operation mode is the bayer format processing mode includes performing core processing on the input image data, using a first core algorithm logic providing bayer format algorithm, and
wherein processing the input image data, using the second circuit when the operation mode is the tetra format processing mode includes performing core processing on the input image data, using a second core algorithm logic providing tetra format algorithm.

20. The operating method of the image signal processor of claim 19, wherein processing the input image data, using the first circuit when the bayer format processing mode is the operation mode further comprises:
performing pre-processing on the input image data, using a first pre-processing algorithm logic, and
wherein processing the input image data using the second circuit when the tetra format processing mode is the operation mode further comprises:
performing pre-processing on the input image data, using a second pre-processing algorithm logic.

* * * * *